(12) United States Patent
Taylor

(10) Patent No.: US 12,740,516 B1
(45) Date of Patent: Sep. 22, 2026

(54) BENDER BOARD RETAINER APPARTATUS

(71) Applicant: Jeffrey Taylor, Chatsworth, CA (US)

(72) Inventor: Jeffrey Taylor, Chatsworth, CA (US)

( * ) Notice: Subject to any disclaimer, the term of this patent is extended or adjusted under 35 U.S.C. 154(b) by 0 days.

(21) Appl. No.: 19/226,241

(22) Filed: Jun. 3, 2025

(51) Int. Cl.
*A01G 9/28* (2018.01)

(52) U.S. Cl.
CPC .................................... *A01G 9/28* (2018.02)

(58) Field of Classification Search
CPC ........ A01G 9/28; A01K 15/006; A01K 15/04; F16B 5/0635; E04H 17/009; E04H 17/063
See application file for complete search history.

(56) References Cited

U.S. PATENT DOCUMENTS 6,226,934 B1 * 5/2001 Gaston .................... A01G 9/28 47/33
6,324,783 B1 * 12/2001 McIntyre ................ A01G 9/28 47/33
6,568,126 B2 * 5/2003 Womack .................. E02B 3/04 47/33
6,625,925 B1 * 9/2003 Foster ...................... A01G 9/28 47/33
7,596,903 B1 * 10/2009 Flanagan ................ A01G 9/28 47/33
7,774,993 B2 * 8/2010 Strobl, Jr. ............ E01C 11/221 47/33
10,729,077 B2 * 8/2020 Bahler .................... A01G 9/28
11,608,655 B2 * 3/2023 Amrine .................... A01G 9/28
2008/0163566 A1 * 7/2008 Bella .................... E01C 11/221 47/33
2009/0199466 A1 * 8/2009 Rosaen .................... A01G 9/28 47/33
2010/0186293 A1 * 7/2010 Flynn ...................... A01G 9/28 47/33
2020/0270835 A1 * 8/2020 Morey .................... A01G 9/28

* cited by examiner

*Primary Examiner* — Trinh T Nguyen
(74) *Attorney, Agent, or Firm* — Gregory B Wood

(57) ABSTRACT

An auger assembly suitable for positioning and securing a bender board to a ground surface includes a gripping device adapted to be removably engage with the bender board and retain the bender board. The auger assembly also includes an auger adapted to be inserted inside the ground surface. The auger is removably engaged with the gripping device and is arranged to rotate relative to the gripping device. The gripping device is arranged to be displaced in a vertical direction in response to the rotation of the auger relative to the gripping device.

6 Claims, 4 Drawing Sheets

BENDER BOARD RETAINER APPARTATUS

TECHNICAL FIELD

The present disclosure relates, generally, to a tool for securing and retaining a bender board with a ground surface. More particularly, the present disclosure pertains to an auger assembly attachable to the bender board to facilitate a user to secure the retain the bender board with ground surface at a desired position.

BACKGROUND

Bender board is generally a flexible strip used to create garden edging, for example, separating flower bed from a grass bed. Generally, the bender board are supported on the ground using bender board stakes. However, bender board stakes supports the bender board from outside and do not secure the bender board with the ground. The stakes may lift from the soil. This may lead to falling, warping, and lifting of the bender board, which is undesirable.

SUMMARY

In one aspect of the disclosure, an auger assembly is disclosed. The auger assembly is suitable for positioning and securing a bender board to a ground surface. The auger assembly includes a gripping device adapted to be removably engage with the bender board and retain the bender board. The auger assembly also includes an auger adapted to be inserted inside the ground surface. The auger is removably engaged with the gripping device and is arranged to rotate relative to the gripping device. The gripping device is arranged to be displaced in a vertical direction in response to the rotation of the auger relative to the gripping device.

In some additional, alternative, or selectively cumulative embodiments, the gripping device includes a hook structure configured to receive and retain the bender board with the gripping device, and a retention structure attached to the hook structure to rotatably retain the auger with the griping device.

In some additional, alternative, or selectively cumulative embodiments, the auger includes an elongated body extending from a first end of the auger to a second end of the auger, a blade attached to the elongated body and spirally extending from the first end towards the second end to enable the insertion of the auger into the ground surface in response to the rotation of the auger, and an engagement structure attached to the elongated body and arranged between the blade and the second end of the auger. The engagement structure is configured to engage with the retention structure to displace the gripping device in the vertical direction in response to the rotation of the auger relative to the gripping device.

In some additional, alternative, or selectively cumulative embodiments, the retention structure includes a stopper defining a slot, and the auger extends through the slot such that the engagement structure is adapted to engage with the stopper to displace the gripping device in the vertical direction in response to the rotation of the auger relative to the gripping device.

In some additional, alternative, or selectively cumulative embodiments, the engagement structure includes a pair of flanges arranged spaced apart, in the vertical direction, from each other, and the stopper is arranged between the pair of flanges. The pair of flanges is adapted to engage with the stopper to displace the gripping device in the vertical direction in response to the rotation of the auger relative to the retention structure.

In some additional, alternative, or selectively cumulative embodiments, a distance between the pair of flanges is selected to be greater than a thickness of the stopper to allow a tilting of the auger during insertion of the auger inside a ground surface.

In some additional, alternative, or selectively cumulative embodiments, a diameter of a portion of the elongated body associated with the engagement structure is smaller than a diameter of the slot to enable the rotation of the auger relative to the retention structure.

In some additional, alternative, or selectively cumulative embodiments, the retention structure includes a pair of first nubs extending inside the slot from the stopper to retain the auger inside the slot.

In some additional, alternative, or selectively cumulative embodiments, the retention structure defines a straight groove intersecting the slot to facilitate an insertion of the auger inside the slot.

In some additional, alternative, or selectively cumulative embodiments, the retention structure includes a pair of second nubs extending inside the straight groove to prevent any undesired removal of the auger from the retention structure through the straight groove.

DETAILED DESCRIPTION

Figure 1:
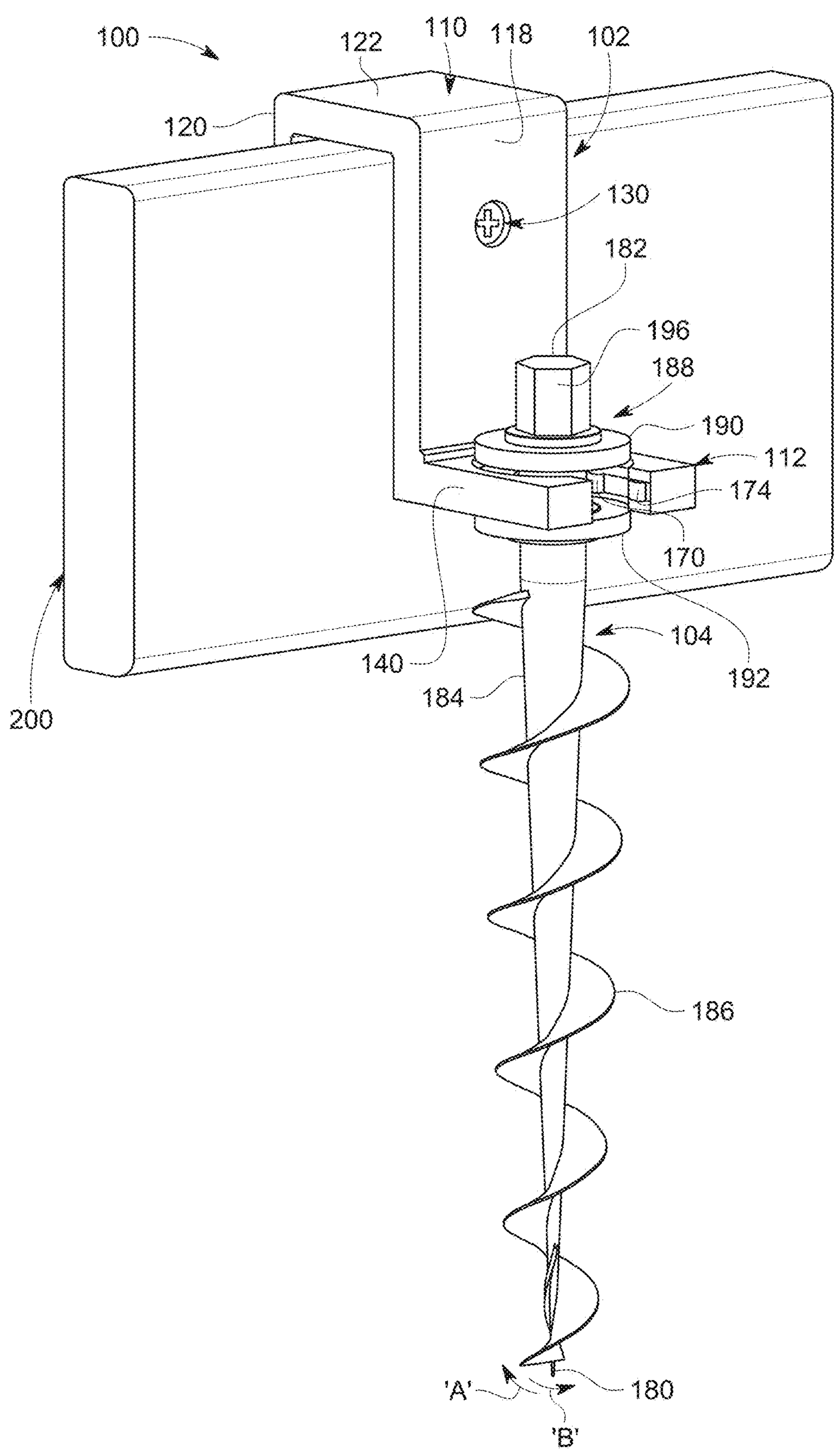
FIG. 1 illustrates a perspective view of an auger assembly engaged with a bender board, in accordance with an embodiment of the disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing example embodiments only and is not intended to be limiting. As used herein, the singular forms “a,” “an” and “the” are intended to include the plural forms as well, unless the context clearly indicates otherwise. It should be recognized that the terms “comprise,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as “first,” “second,” etc., are only used to distinguish one element from another. For example, one element could be termed a “first element” and similarly, another element could be termed a "second element," or vice versa. The section headings used herein are for organizational purposes only and are not to be construed as limiting the subject matter described.

Unless indicated otherwise, the terms "about," "thereabout," "substantially," etc., mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," "left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Referring to FIG. 1, an auger assembly 100 engaged to a bender board 200 is shown. The bender board 200 is configured to positioned at a ground surface to define a boundary between a grass and a flower bed, and the auger assembly 100 facilitates a desired positioning of the bender board 200 at the ground surface, and secures and retains the bender board with the ground surface. For so doing the auger assembly 100 is adapted for insertion inside the ground surface, for example, a soil. As shown, the auger assembly 100 includes a gripping device 102 adapted to be removably engaged/secured with the bender board 200, and an auger 104 adapted to be removably engaged with the gripping device 102 and configured for insertion inside the ground surface.

Referring to FIGS. 1 to 4, the gripping device 102 includes a hook structure 110 adapted to removably engage/secure with the bender board 200 and a retention structure 112 adapted to removably retain the auger 104. As shown, the hook structure 110 includes an inverted J-shape defining a vertically extending groove 116 to receive a portion of the bender board 200. The hook structure 110 includes a first vertical plate 118, a second vertical plate 120 arranged spaced apart from the first vertical plate 118 and defining the vertical groove 116 therebetween, and a connecting plate 122 extending substantially horizontally between the first plate 118 and the second plate 120 and connecting the first plate 118 and the second plate 120. To secure the bender board 200 with the hook structure 110 upon insertion of the bender board 200 inside the groove 116, the first plate 118 defines a hole 130, and a fastener 300 is extended through the hole 130 to secure the bender board 200 with the hook structure 110 i.e., the gripping device 102.

Figure 2:
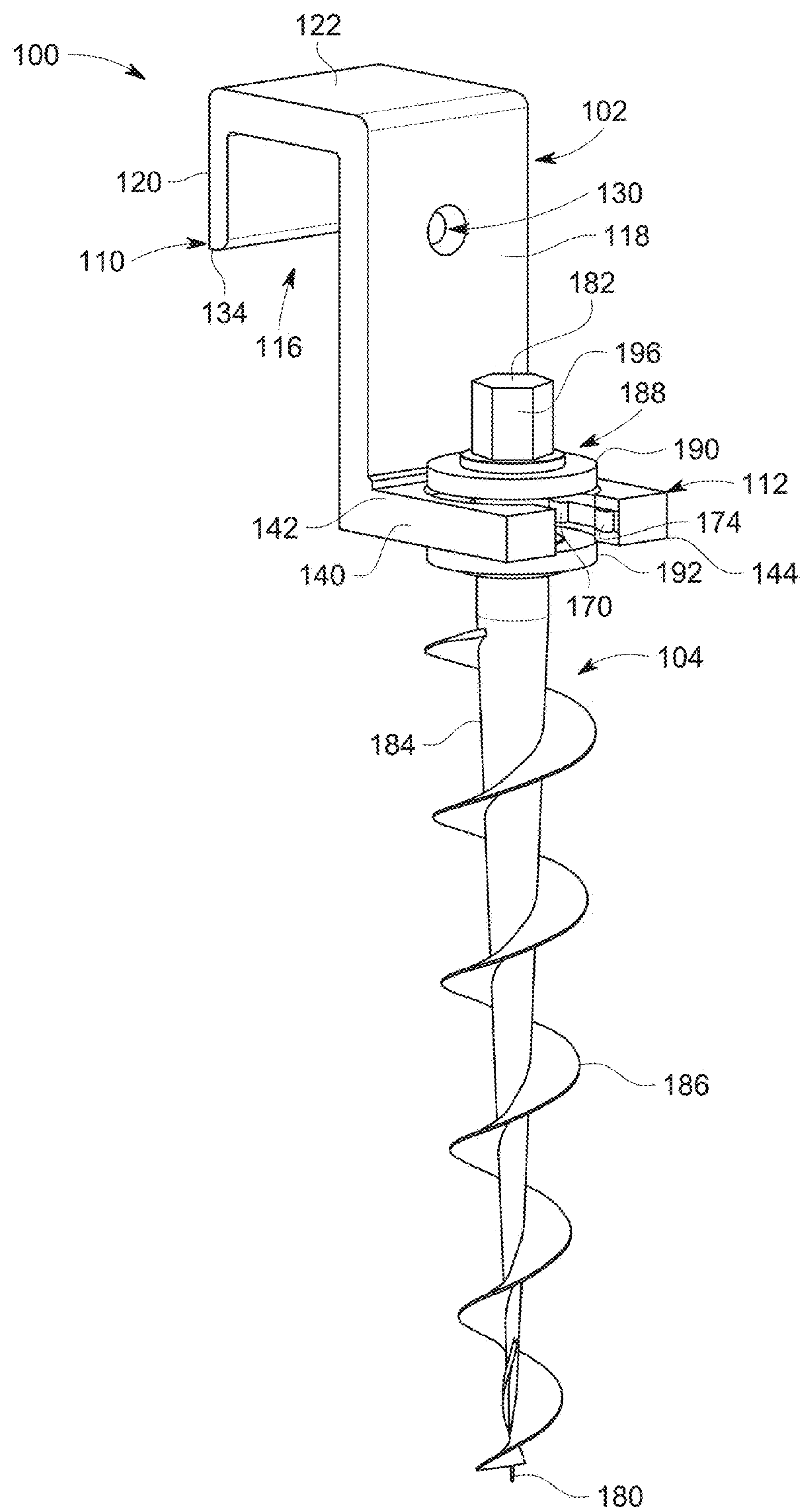
FIG. 2 illustrates a perspective view of the auger assembly of FIG. 1 with bender board removed, in accordance with an embodiment of the disclosure.
Figure 3:
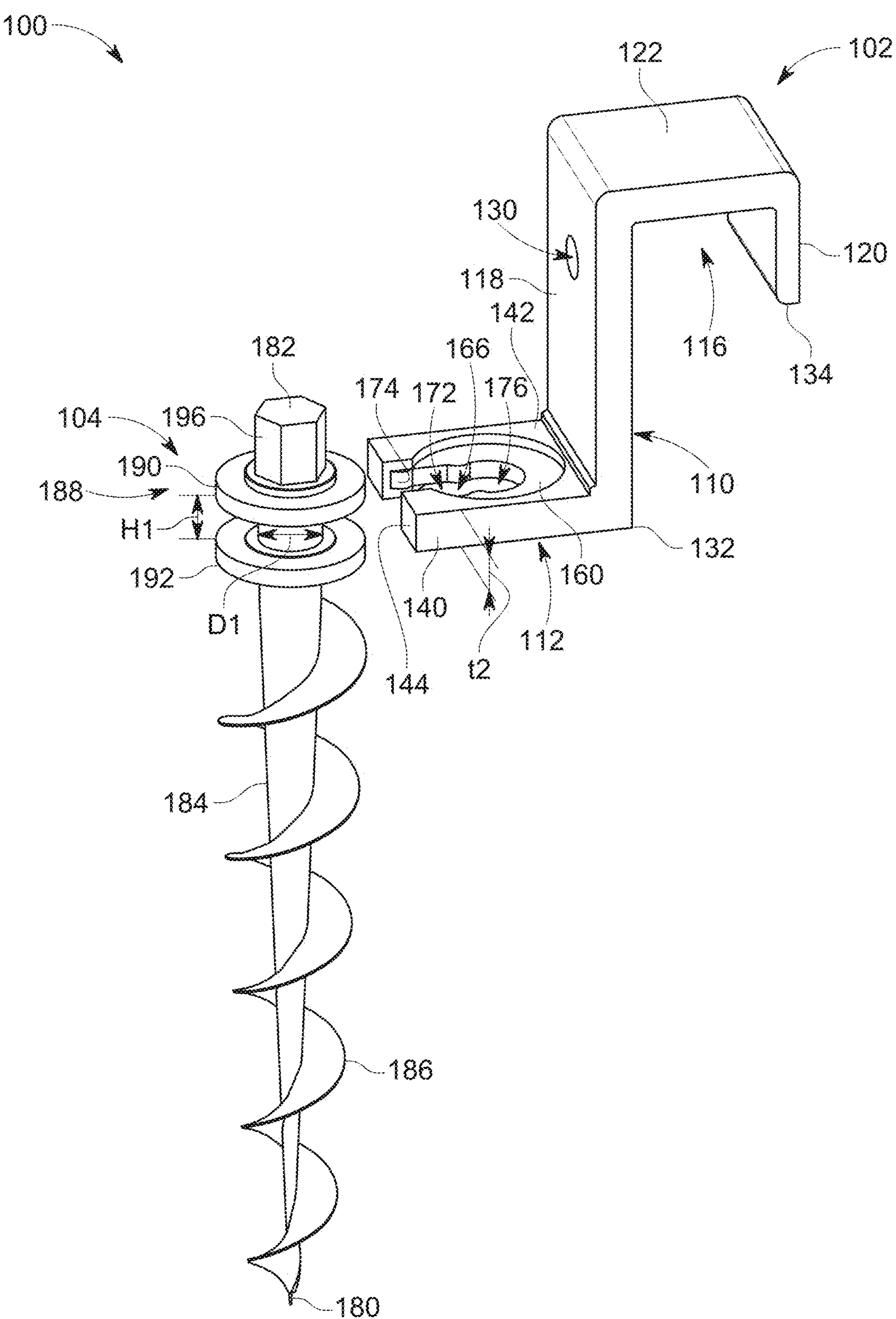
FIG. 3 illustrates an exploded view of the auger assembly of FIG. 2, in accordance with an embodiment of the disclosure.
Figure 4:
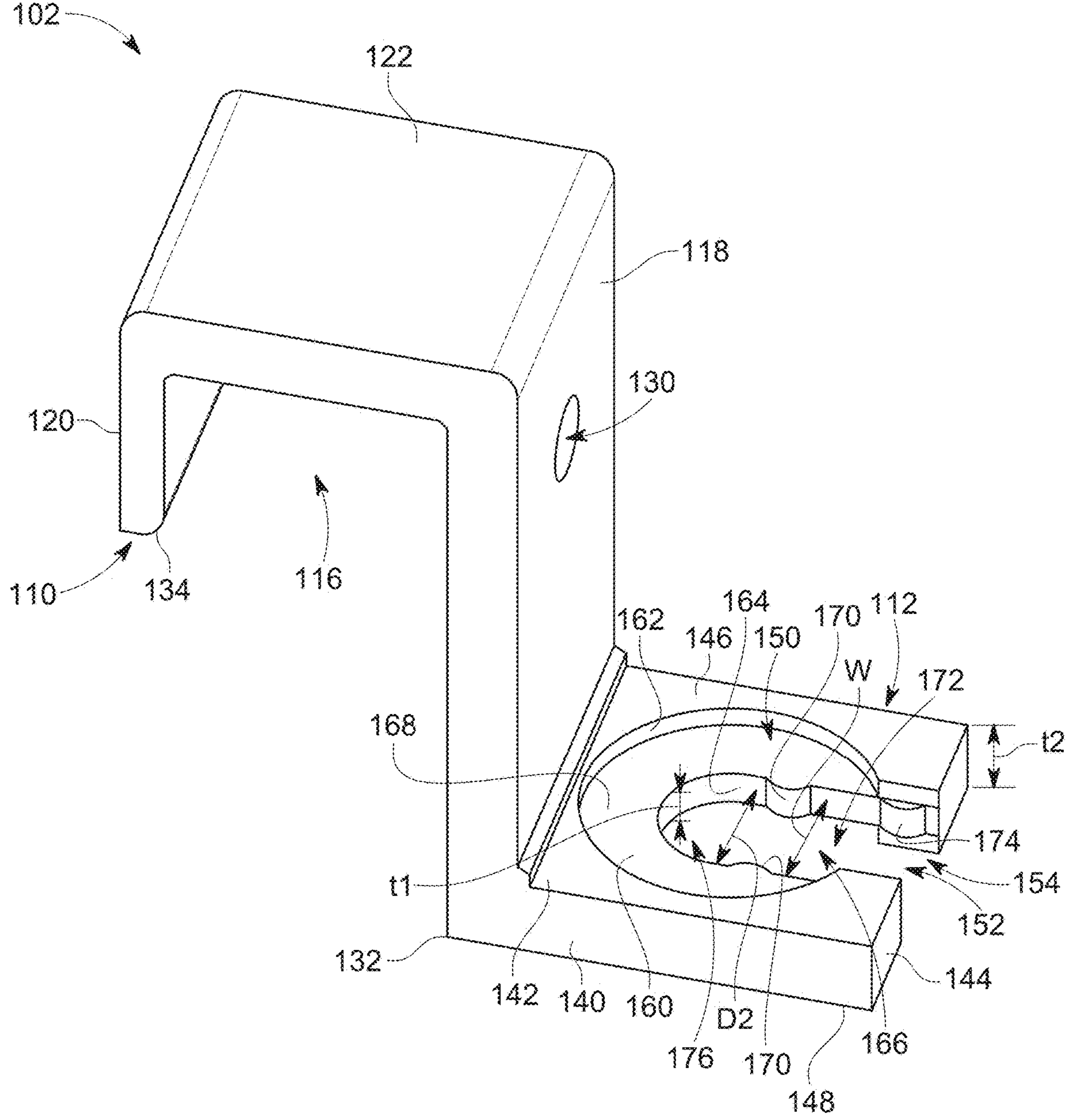
FIG. 4 illustrates a perspective view of a gripping device of the auger assembly of FIG. 2, in accordance with an embodiment of the disclosure.

As shown, a length of the first vertical plate 118 is greater than the second plate 120, and hence a lower end 132 of the first plate 118 extends vertically downwardly of a lower end 134 of the second plate 120. In the embodiment, the retention structure 112 is arranged attached to the first plate 118 and extends substantially horizontally from the lower end 132 of the first plate 118. As shown in FIGS. 2 to 4, the retention structure 112 and the vertically extending groove 116 are arranged on opposite sides of the first plate 118.

Referring now to FIGS. 3 and 4, the retention structure 112 includes a plate body 140 having a first end 142 attached to the first plate 118 and a second end 144 arranged away from the first plate 118. The plate body 140 also includes a first surface 146, i.e., upper surface 146, and a second surface 148, i.e., a lower surface 148, disposed opposite to the upper surface 146. The plate body 140 defines a substantially cylindrical groove 150 extending from the upper surface 146 to the lower surface 148, and an elongated straight groove 152 extending from the second end 144 i.e., free end 144 to the cylindrical groove 150, intersecting the cylindrical groove 150, and extending through a thickness of the plate body 140 from the upper surface 146 to the lower surface 148. The straight groove 152 includes an opening 154 defined at the second end 144 for insertion of the auger 104 inside the plate body 140.

Additionally, the retention structure 112 includes a stopper 160 extending inwardly inside the cylindrical groove 150 from an inner surface 162 of the plate body 140. In the illustrated embodiment, the stopper 160 includes an inner surface 164 defining a horizontally oriented U-shape slot 166 having an opening of the slot 166 arranged at an interface of the cylindrical groove 150 and the straight groove 152. Also, an upper surface 168 of the stopper 160 is arranged downwardly of the upper surface 146 of the plate body 140 and offset from the upper surface 146 of the plate body 140, and a lower surface of the stopper 160 may be vertically offset from the lower surface 148 of the plate body 140 and is arranged inside the cylindrical groove 150.

Further, the retention structure 112 includes a plurality of nubs, for example, a pair of first nubs 170 extending inside a straight portion 172 of the slot 166 and a pair of second nubs 174 extending inside the straight groove 152. As shown, the first nubs 170 are attached to the stopper 160, and are arranged at an interface of a curved portion 176 of the slot 166 with the straight portion 172 of the slot 166, and are arranged opposite to and facing each other. Similarly, the second nubs 174 are arranged opposite to and facing each other and extends from the inner surface 164 of the plate body 140 corresponding to the straight groove 152. The nubs 170, 174 prevent any undesired removal of the auger 104 from the slot 166 through the straight groove 152, and retain the auger 104 inside curved portion 176 of the slot 166.

Referring to FIG. 3, the auger 104 includes a first end 180, a second end 182, an elongated body 184 extending from the first end 180 to the second end 182, a spirally/helically extending blade 186 attached to the body 184 and extending from the first end 180 toward the second end 182, and an engagement structure 188 attached to elongated body 184 and arranged between the blade 186 and the second end 184 of the auger 104 in a vertical direction. The blade 186 and the first end 180 which may be sharp needle like end facilitates the insertion of the auger 104 inside the ground surface and removal of the auger 104 from the ground surface upon rotation of the auger 104. In the embodiment, the engagement structure 188 is adapted to cooperate with the retention structure 112 of the gripping device 102 to enable a retention of the auger 104 with the gripping device 104 such that the auger 104 is adapted to rotate relative to the gripping device 102, while the gripping device 102 translates/displaces in the vertical direction with the displacement of the auger 104 in the vertical direction.

As shown, the engagement structure 188 includes a pair of flanges, for example, a first flange 190 and a second flange 192, arranged spaced apart, in a vertical direction, from each other. In the assembly of the auger 104 with the retention structure 112, the stopper 160 is arranged between the two flanges 190, 192. Also, it may be noted that a vertical distance, H1, shown in FIG. 3, between the two flanges 190, 192 is selected to be greater than a thickness 't1', shown in FIG. 4, of the stopper 160 and/or a thickness '2', shown in FIGS. 3 and 4, of the plate body 140 to allow a tilting of the auger 104 relative to the retention structure 112 during insertion of the auger 104 inside the ground surface. Also, a diameter 'D1' of a portion of the elongated body 184 arranged between the flanges 190, 192 is smaller than a diameter 'D2', shown in FIG. 4, of the curved portion 176 of the slot 166 and/or a width 'W' of the straight portion 172 of the slot 166. This is to provide a radial gap between the inner surface 164 of the stopper 160 and an outer surface of the body 184 to allow the tilting of the auger 104 relative to the retention structure 112 when the auger 104 is being inserted inside the ground surface and is engaged with the gripping device 102.

Also, diameters of the flanges 190, 192 are selected to be larger than a diameter of the circular portion 176 of the slot 166. Accordingly, the flanges 190, 192 are arranged to abut the stopper 160 and push the retention structure 112 i.e., the gripping device 102 downwardly or upwardly in response to the rotation of the auger 104 for insertion of the auger 104 into the ground surface or removal of the auger 104 from the ground surface. In the embodiment, the first flange 190, i.e., the upper flange 190, is adapted to contact the upper surface 168 of the stopper 160 during insertion of the auger 104 inside the ground, and push the retention structure 112 and hence the gripping device 102 downwardly in response to the rotation of the auger 104 in a first direction 'A', shown in FIG. 1 relative to the gripping device 102. Also, the second flange 192, i.e., the lower flange 192, is arranged to contact the lower surface of the stopper 160 to move the retention structure 112 and hence the gripping device 102 upwardly during removal of the auger 104 from the ground as the auger 104 is rotated in a second direction 'B', shown in FIG. 1, opposite to the first direction 'A' relative to the gripping device 102. As the auger 104 is configured to rotate relative to the gripping device 102, the gripping device 102 and the bender board 200 attached to the gripping device 102 do not rotate in response to the rotation of the auger 104 about the central axis. To enable a user to rotate the auger 104 about the central axis, the auger 102 includes a head 196 extending upwardly of the first flange 190 to the second end 182 of the auger 104. In the embodiment, the head 196 includes a hexagonal shape to enable the user to engage a suitable tool with the auger 104 to rotate the auger 104. However, the head 196 may include any other suitable shape known in the art.

A method for positioning and securing the bender board 200 at desired location contacting the ground surface is now described. For positioning and securing the bender board 200 at the desired location with the ground surface, a user engages the gripping device 102 with the bender board 200. For so doing, the user inserts a portion of the bender board 200 inside the vertical groove 116 of the hook structure 110 of the gripping device 102 and securely engages the gripping device 102 with the bender board 200 by inserting the fastener 300 through the hole 130 of the hook structure 110 and engaging the fastener 300 with the bender board 200.

Subsequently, or otherwise, the user engages the auger 104 with the retention structure 112 of the gripping device 102. For so doing, the user insert the auger 104 inside the slot 166 through the opening 154 of the straight groove 152, and positions the auger 104 inside the slot 166 such that the first flange 190 is arranged vertically above the stopper 160, while the second flange 192 is arranged vertically below the stopper 160 with the blade 186 of the auger 104 extending downwardly of the retention structure 112. Also, in such a position, the portion of the elongated body 184 of the auger 104 extending between the flanges 190, 192 is arranged inside the curved portion 176 of the slot 166.

Thereafter, the user positions the first end 180 of the auger 104 contacting the ground surface, and starts rotating the auger 104 in the first direction 'A' by engaging a suitable tool with the head 196 of the auger 104. In response to the rotation of the auger 104 in the first direction 'A' relative to the retention structure 112, the auger 104 starts moving vertically downwardly and inside the ground surface. Due to the vertically downward movement of the auger 104, the first flange 190 contacts the retention structure 112 i.e., plate body 140 or the stopper 160, and pushes the gripping device 102 downwardly. This causes the bender board 200 also to move vertically downwardly and to contact and engage with the ground surface. In this manner, by rotating the auger 104 relative to the gripping device 102, the gripping device 102 and the bender board 200 is moved vertically downwardly to engage and secure the bender board 200 with the ground surface at the desired location.

It should be understood that the foregoing description is only illustrative of the aspects of the disclosed embodiments. Various alternatives and modifications can be devised by those skilled in the art without departing from the aspects of the disclosed embodiments. Accordingly, the aspects of the disclosed embodiments are intended to embrace all such alternatives, modifications, and variances that fall within the scope of the appended claims. Further, the mere fact that different features are recited in mutually different dependent or independent claims does not indicate that a combination of these features cannot be advantageously used, such as a combination remaining within the scope of the aspects of the disclosed embodiments.

What is claimed is:

1. An auger assembly for positioning and securing a bender board to a ground surface, the auger assembly comprising:

a gripping device adapted to be removably engaged with the bender board and retain the bender board; the gripping device having a hook structure configured to receive and retain the bender board, and a retention structure attached to the hook structure, the retention structure having a stopper defining a slot;

an auger having an elongated body extending from a first end of the auger to a second end of the auger and a blade attached to the elongated body and spirally extending from the first end towards the second end to enable the insertion of the auger into the ground surface in response to the rotation of the auger;

an engagement structure attached to the elongated body and arranged between the blade and the second end of the auger, the engagement structure configured to extend through the slot and engage with the stopper such that the engagement structure displaces the gripping device in the vertical direction in response to the rotation of the auger relative to the gripping device, the engagement structure further having a pair of flanges vertically spaced apart from each other with the stopper positioned between the pair of flanges, wherein the pair of flanges engage with the stopper to displace the gripping device in the vertical direction in response to the rotation of the auger relative to the retention structure, the auger being engaged with the gripping device to rotate relative to the gripping device.

2. The auger assembly of claim 1, wherein a distance between the pair of flanges is selected to be greater than a thickness of the stopper to allow a tilting of the auger during insertion of the auger inside a ground surface.

3. The auger assembly of claim 1, wherein a diameter of a portion of the elongated body associated with the engagement structure is smaller than a diameter of the slot to enable the rotation of the auger relative to the retention structure.

4. The auger assembly of claim 1, wherein the retention structure includes a pair of first nubs extending inside the slot from the stopper to retain the auger inside the slot.

5. The auger assembly of claim 1, wherein the retention structure defines a straight groove intersecting the slot to facilitate an insertion of the auger inside the slot.

6. The auger assembly of claim 5, wherein the retention structure includes a pair of second nubs extending inside the straight groove to prevent any undesired removal of the auger from the retention structure through the straight groove.

* * * * *